US011428305B2

United States Patent
Ilo

(10) Patent No.: US 11,428,305 B2
(45) Date of Patent: Aug. 30, 2022

(54) PULLEY STRUCTURE

(71) Applicant: Mitsuboshi Belting Ltd., Kobe (JP)

(72) Inventor: Norihisa Ilo, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 107 days.

(21) Appl. No.: 17/058,500

(22) PCT Filed: May 24, 2019

(86) PCT No.: PCT/JP2019/020748
§ 371 (c)(1),
(2) Date: Nov. 24, 2020

(87) PCT Pub. No.: WO2019/225750
PCT Pub. Date: Nov. 28, 2019

(65) Prior Publication Data
US 2021/0199186 A1    Jul. 1, 2021

(30) Foreign Application Priority Data

May 24, 2018 (JP) .............................. JP2018-099470
May 9, 2019 (JP) .............................. JP2019-088735

(51) Int. Cl.
*F16H 55/36* (2006.01)
*F16D 41/20* (2006.01)
*F16D 7/02* (2006.01)
*F16F 1/06* (2006.01)
*F16F 15/121* (2006.01)

(52) U.S. Cl.
CPC ............. *F16H 55/36* (2013.01); *F16D 7/022* (2013.01); *F16D 41/206* (2013.01); *F16F 1/065* (2013.01);
(Continued)

(58) Field of Classification Search
CPC .. F16H 55/36; F16H 2055/366; F16D 41/206; F16D 7/022; F16D 2300/12;
(Continued)

(56) References Cited

U.S. PATENT DOCUMENTS 8,177,669 B2      5/2012  Ishida et al.
2004/0014540 A1*  1/2004  Dell .................. F16H 55/36
                                                      474/69
(Continued)

FOREIGN PATENT DOCUMENTS

JP    2008232328 A    10/2008
JP    2014-114947 A    6/2014
(Continued)

OTHER PUBLICATIONS

Feb. 8, 2022—(CA) Office Action—App 3,100,463.
(Continued)

*Primary Examiner* — Ernesto A Suarez
*Assistant Examiner* — Lori Wu
(74) *Attorney, Agent, or Firm* — Banner & Witcoff, Ltd.

(57) ABSTRACT

A pulley structure includes: a cylindrical outer rotation body; an inner rotation body; and a torsion coil spring. The torsion coil spring includes: one end region which is in contact with one rotation body; the other end region which is in contact with the other rotation body; and a middle region. The other rotation body includes: a first contact surface; a facing surface; an inclined surface; and a second contact surface. The facing surface includes a constraining surface connected to the inclined surface. The constraining surface is configured to be capable of constraining the other end region of the torsion coil spring before press fitting so as to prevent a displacement of an axis of the torsion coil spring before the press fitting with respect to an axis of the other rotation body.

5 Claims, 8 Drawing Sheets

(52) U.S. Cl.
CPC ...... *F16F 15/1216* (2013.01); *F16D 2300/22* (2013.01); *F16H 2055/366* (2013.01)

(58) Field of Classification Search
CPC ........ F16D 2300/22; F16D 3/12; F16F 1/065; F16F 15/1216
See application file for complete search history.

(56) References Cited

U.S. PATENT DOCUMENTS

| | | | | |
|---|---|---|---|---|
| 2013/0324335 | A1* | 12/2013 | Chen | F16D 41/206 474/94 |
| 2015/0060232 | A1* | 3/2015 | Tran | F16F 15/123 192/41 S |
| 2015/0184703 | A1 | 7/2015 | Shimamura et al. | |
| 2017/0298995 | A1* | 10/2017 | Serkh | F16D 3/72 |
| 2019/0136957 | A1 | 5/2019 | Shimamura et al. | |

FOREIGN PATENT DOCUMENTS

| | | |
|---|---|---|
| JP | 2017-106616 A | 6/2017 |
| WO | 2017/188389 A1 | 11/2017 |

OTHER PUBLICATIONS

Mar. 2, 2022—(EP) Extended Search Report—App. 19806931.2.
Jul. 9, 2019—International Search Report—Intl App PCT/JP2019/020748.

* cited by examiner

OTHER END SIDE ←→ ONE END SIDE
AXIAL DIRECTION
RADIAL DIRECTION ↕

PULLEY STRUCTURE

CROSS REFERENCE TO RELATED APPLICATIONS

This is a U.S. National Phase Application under 35 U.S.C. § 371 of International Application No. PCT/JP2019/020748, filed May 24, 2019, which claims priority to Japanese Application Nos. 2018-099470, filed May 24, 2018, and 2019-088735, filed May 9, 2019, which was published Under PCT Article 21(2), the entire contents of which are incorporated herein by reference.

TECHNICAL FIELD

The present invention relates to a pulley structure including a torsion coil spring.

BACKGROUND ART

A torsion coil spring in Patent Literature 1 has a one end region, the other end region, and a middle region. The one end region is a portion on one end side in an axial direction along a rotation axis of the torsion coil spring, and is in contact with one rotation body of an outer rotation body and an inner rotation body. The other end region is a portion on the other end side in the axial direction of the torsion coil spring, an inner circumferential surface thereof is in contact with the other rotation body of the outer rotation body and the inner rotation body, and an outer circumferential surface thereof is not in contact with the outer rotation body nor the inner rotation body in a state where no external force is applied to the pulley structure. The middle region is a portion between the one end region and the other end region of the torsion coil spring, and is not in contact with the outer rotation body nor the inner rotation body in the state where no external force is applied to the pulley structure. When the torsion coil spring is twisted in a diameter increasing direction due to a relative rotation between the outer rotation body and the inner rotation body, at least a part of the other end region is configured to be separated from the other rotation body. With such a configuration, fatigue resistance of the torsion coil spring can be improved without increasing the number of turns of the spring.

The other rotation body in Patent Literature 1 has a contact surface (corresponding to a "first contact surface" of the present application) that comes into contact with the inner circumferential surface of the other end region of the torsion coil spring in the state where no external force is applied to the pulley structure. In the state where no external force is applied to the pulley structure (that is, when the pulley structure is in a stop state), an outer circumferential surface of the one end region of the torsion coil spring is pressed against a pressure contact surface by a self-elastic restoring force of the torsion coil spring in the diameter increasing direction, the inner circumferential surface of the other end region of the torsion coil spring comes into contact with the contact surface in a state where a diameter thereof is slightly increased, and the inner circumferential surface of the other end region of the torsion coil spring is pressed against the contact surface by the self-elastic restoring force of the torsion coil spring in a diameter decreasing direction.

CITATION LIST

Patent Literature

Patent Literature 1: JP-A-2014-114947

SUMMARY OF INVENTION

Technical Problem

However, as in Patent Literature 1, in the configuration in which at least a part of the other end region of the torsion coil spring is separated from the other rotation body in the case where the torsion coil spring is twisted in the diameter increasing direction due to the relative rotation between the outer rotation body and the inner rotation body, when the torsion coil spring is twisted in the diameter increasing direction due to the relative rotation between the outer rotation body and the inner rotation body (in the case of deforming in the diameter increasing direction), a fixing force for the other rotation body in the other end region may be smaller than a fixing force for the one rotation body in the one end region. Therefore, the axis of the torsion coil spring may be eccentric or inclined with respect to the rotation axes of both rotation bodies due to external factors such as vibration. As a result, problems that a posture of the torsion coil spring is unstable and the torsion coil spring cannot be stably twisted and deformed may be caused.

In the pulley structure described in Patent Literature 1, for example, when the torsion coil spring is press-fitted into the other rotation body, the torsion coil spring is brought into contact with the contact surface of the other rotation body in a state where the diameter thereof is slightly increased, as described above.

On the other hand, in Patent Literature 1, the other rotation body has the contact surface in contact with the inner circumferential surface of the other end region, a facing surface facing an inner circumferential surface of the middle region and separated from the inner circumferential surface of the middle region, and an inclined surface inclined with respect to the axial direction and connecting the contact surface and the facing surface. Accordingly, the diameter of the inner circumferential surface of the torsion coil spring immediately before press fitting is smaller than a diameter of the contact surface and larger than a diameter of the facing surface.

Therefore, when the torsion coil spring is set on the other rotation body immediately before the press fitting the torsion coil spring, the torsion coil spring comes into contact with the inclined surface at only a part of the other end in the circumferential direction. The torsion coil spring is separated from the inclined surface and the facing surface in a region on one end side in the axial direction. Therefore, the posture of the other end region of the torsion coil spring is not sufficiently constrained by the other rotation body, and the posture of the torsion coil spring is unstable. As a result, the axis of the torsion coil spring may be displaced (eccentric, inclined) with respect to the axis of the other rotation body.

When the torsion coil spring in this state is pressed against the contact surface using a press machine, the pressing load concentrates on a portion where the torsion coil spring is in contact with the inclined surface. In addition, when the axis of the torsion coil spring is inclined with respect to the axis of the other rotation body, the torsion coil spring may be stuck on the inclined surface. In this case, the other end region of the torsion coil spring may be distorted by the pressing load of the press machine.

In this state, when the pressing load of the press machine is further increased so that the other end region of the torsion coil spring is deformed in the diameter increasing direction and the torsion coil spring is press-fitted to a position in contact with the contact surface, an end surface of the other end region in the axial direction and end surface (corresponding to a "second contact surface" in the present application) on one side of an annular plate portion of the inner rotation body in the axial direction may not be sufficiently brought into close contact with each other. In this case, the above problems that the posture of the torsion coil spring is unstable and the torsion coil spring cannot be stably twisted and deformed are likely to occur.

Further, as described above, in a case where the press fitting of the other end region is performed in a state where the other end region of the torsion coil spring is distorted, when the other end region of the torsion coil spring gets over a boundary portion between the inclined surface and the contact surface of the other rotation body and moves to the position in contact with the contact surface, the boundary portion may be scraped linearly and metal powders may be generated. In this case, the released metal powders adhere to a portion of each rotation body that is frequently in contact with the torsion coil spring (for example, the contact surface, and a pressure contact surface or an annular surface to be described later) or a sliding bearing, and these portions are likely to be worn. As a result, the life of the pulley structure may be shortened.

That is, in the pulley structure in Patent Literature 1, the press fitting of the torsion coil spring into the other rotation body during production may deteriorate the production quality of the pulley structure. Here, the term "production quality" refers to the quality of the produced product.

In order not to deteriorate the production quality, it is conceivable that, when press-fitting the torsion coil spring, an operator manually adjusts the position and posture of the torsion coil spring and then press-fits the torsion coil spring with a press machine. However, in this case, it is difficult to automate the work of press-fitting the torsion coil spring, resulting in reduced productivity.

An object of the present invention is to provide a pulley structure capable of improving productivity while ensuring production quality.

Solution to Problem

A pulley structure according to a first aspect of the present invention includes: a cylindrical outer rotation body around which a belt is to be wound; an inner rotation body which is provided inward of the outer rotation body, and relatively rotatable with respect to the outer rotation body about a same rotation axis as the outer rotation body; and a torsion coil spring which is provided between the outer rotation body and the inner rotation body, in which the torsion coil spring includes one end region which is on one end side in an axial direction along the rotation axis and in contact with one rotation body of the outer rotation body and the inner rotation body, the other end region which is on the other end side in the axial direction and in contact with the other rotation body of the outer rotation body and the inner rotation body, and a middle region which is between the one end region and the other end region and not in contact with the outer rotation body nor the inner rotation body in a state where no external force is applied to the pulley structure, in which the other rotation body has a first contact surface which is in contact with an inner circumferential surface of the other end region of the torsion coil spring in the state where no external force is applied to the pulley structure, a facing surface which is located closer to the one end side in the axial direction than the first contact surface, and is spaced apart from and facing an inner circumferential surface of the torsion coil spring, an inclined surface which is located between the first contact surface and the facing surface in the axial direction, connects the first contact surface and the facing surface, and is inclined with respect to the axial direction, and a second contact surface which is in contact with an end surface on the other end side of the torsion coil spring in the axial direction, in which in the case where the torsion coil spring is twisted in a diameter increasing direction due to a relative rotation between the outer rotation body and the inner rotation body, at least a part of the other end region of the torsion coil spring is configured to be separated from the first contact surface, in which when the torsion coil spring is press-fitted into the other rotation body, the inner circumferential surface of the other end region is brought into contact with the first contact surface and the end surface on the other end side in the axial direction is brought into contact with the second contact surface, in which the facing surface has a constraining surface connected to the inclined surface, and in which the constraining surface is configured to be capable of constraining the other end region of the torsion coil spring before press fitting so as to prevent a displacement of an axis of the torsion coil spring before the press fitting with respect to an axis of the other rotation body.

According to this configuration, when the torsion coil spring before the press fitting is set on the other rotation body, the inner circumferential surface of the torsion coil spring is constrained by the constraining surface. Thus, the displacement (eccentricity or inclination) of the axis of the torsion coil spring with respect to the other rotation body is prevented. Accordingly, the posture of the torsion coil spring is stable, the inner circumferential surface of the other end region comes into contact with the first contact surface, and the end surface on the other end side (other end surface) of the torsion coil spring in the axial direction moves to a position in contact with the second contact surface without the distortion of the other end region during the press fitting. As a result, in the pulley structure, adhesion between the other end surface of the torsion coil spring in the axial direction and the second contact surface is increased, and the axis of the torsion coil spring is less likely to be displaced from the rotation axes of both rotation bodies due to external factors such as vibration. Accordingly, the above problems that the posture of the torsion coil spring is unstable and the torsion coil spring cannot be stably twisted and deformed are less likely to occur.

In this configuration, a pressing load applied to a portion where the torsion coil spring is in contact with the other rotation body during the press fitting can be minimized. Accordingly, it is less likely to occur that the portion where the other rotation body is in contact with the torsion coil spring is linearly scraped to generate metal powders due to the sliding between the torsion coil spring and the other rotation body. Accordingly, it is less likely that the released metal powders adhere to a sliding bearing or a portion of each rotation body that is frequently in contact with the torsion coil spring (for example, the contact surface, and a pressure contact surface or an annular surface to be described later), and that these portions are easily worn. The life of the pulley structure can be extended.

Therefore, the production quality of the pulley structure can be improved.

Since it is not necessary for the operator to correct the posture of the torsion coil spring as described below when setting the torsion coil spring on the other rotation body before the press fitting, labor can be saved in a press-fitting step. As a result, the productivity when producing the pulley structure can be increased.

A pulley structure according to a second aspect of the present invention is the pulley structure according to the first aspect, in which the constraining surface extends continuously over an entire circumference of the other rotation body in a circumferential direction.

According to this configuration, the other end region can be constrained by the constraining surface over the entire circumference in the circumferential direction in a state where the torsion coil spring before the press fitting is set on the other rotation body. Accordingly, when the torsion coil spring before the press fitting is set on the other rotation body, the torsion coil spring is sufficiently constrained by the constraining surface. Thus, the displacement of the axis of the torsion coil spring with respect to the rotation axis of the other rotation body is prevented.

A pulley structure according to a third aspect of the present invention is the pulley structure according to the second aspect, in which a diameter of the constraining surface is substantially equal to an inner diameter of the other end region of the torsion coil spring before the press fitting.

According to this configuration, the diameter of the constraining surface is substantially equal to the inner diameter of the other end region of the torsion coil spring before the press fitting. Thus, in a state where the torsion coil spring before the press fitting is set on the other rotation body, the torsion coil spring is sufficiently constrained by the constraining surface to prevent the displacement of the axis of the torsion coil spring with respect to the rotation axis of the other rotation body.

A pulley structure according to a fourth aspect of the present invention is the pulley structure according to the third aspect, in which the diameter of the constraining surface is equal to or smaller than an upper limit value that is 0.15 mm smaller than a reference dimension of the inner diameter of the other end region of the torsion coil spring before the press fitting, and is equal to or larger than a lower limit value that is 0.05 mm smaller than the upper limit value.

According to this configuration, the diameter of the constraining surface is within a range in which an allowable minimum value (a dimension 0.15 mm smaller than the reference dimension) of the inner diameter of the other end region of the torsion coil spring before the press fitting is the upper limit value and a dimension 0.05 mm smaller than this upper limit value is the lower limit value. Thus, in a state where the torsion coil spring before the press fitting is set on the other rotation body, the other end region is constrained by the constraining surface to prevent the displacement of the axis of the torsion coil spring with respect to the rotation axis of the other rotation body.

A pulley structure according to a fifth aspect of the present invention is the pulley structure according to the first to fourth aspects, in which a length of the constraining surface in the axial direction is equal to or longer than a length of the other end region of the torsion coil spring in the axial direction before the press fitting.

According to this configuration, in a state where the torsion coil spring before the press fitting is set on the other rotation body, the other end region of the torsion coil spring is constrained by the constraining surface over the entire axial length thereof. Therefore, the displacement of the axis of the torsion coil spring with respect to the rotation axis of the other rotation body can be more reliably prevented.

Advantageous Effects of Invention

According to the present invention, the production quality of the pulley structure can be improved and the productivity when producing the pulley structure can be increased.

DESCRIPTION OF EMBODIMENTS

Hereinafter, preferred embodiments of the present invention is described.

A pulley structure 1 according to the embodiment of the present invention is described with reference to FIG. 1 to FIG. 4. The pulley structure 1 is, for example, installed on a drive shaft S (see FIG. 1) of an alternator in an auxiliary drive system (not shown) of a vehicle. The auxiliary drive system includes a drive pulley attached to a crankshaft of an engine, a driven pulley and the pulley structure 1 for driving an auxiliary unit such as an alternator, and a belt B (see FIG. 1) wound around the pulleys and the pulley structure 1. When the rotation of the crankshaft is transmitted to the driven pulley and the pulley structure 1 via the belt B, the auxiliary unit such as an alternator is driven. As a rotation speed of the crankshaft changes in accordance with the combustion of the engine, the traveling speed of the belt B also changes.

Figure 1:
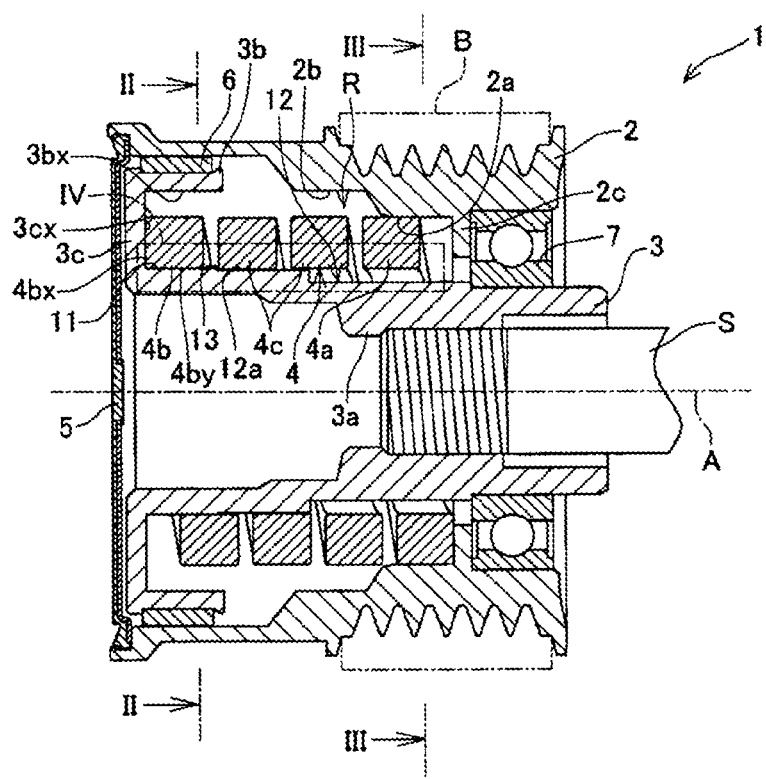
FIG. 1 is a cross-sectional view of a pulley structure according to an embodiment of the present invention, taken along an axial direction.
Figure 2:
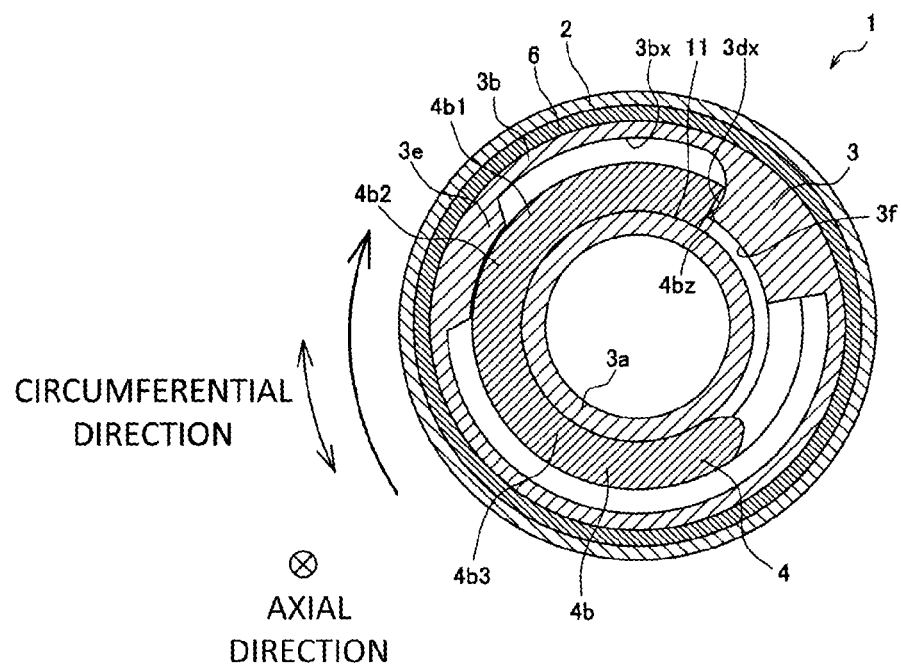
FIG. 2 is a cross-sectional view taken along a line II-II in FIG. 1.
Figure 3:
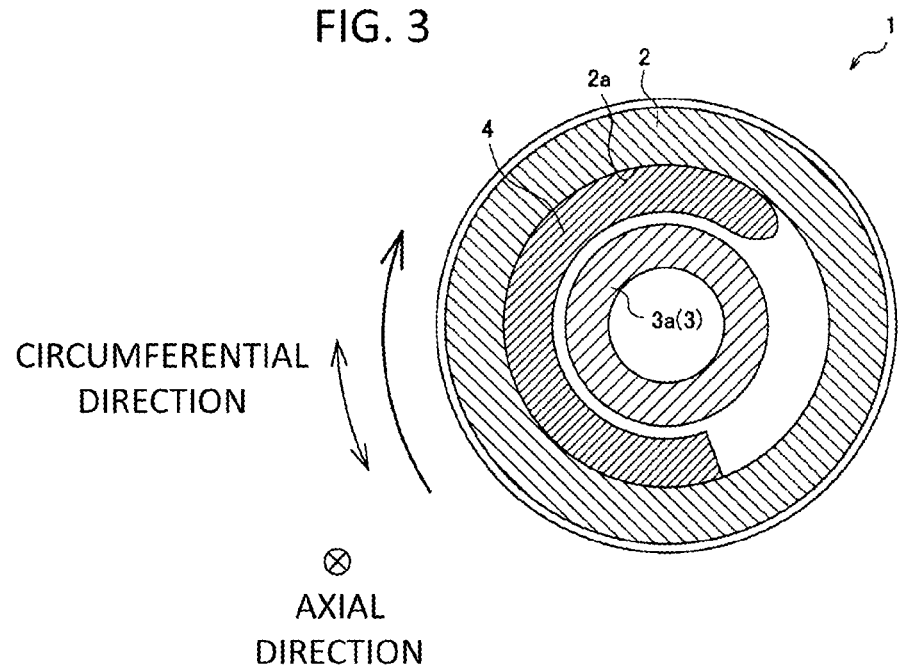
FIG. 3 is a cross-sectional view taken along a line in FIG. 2.
Figure 4:
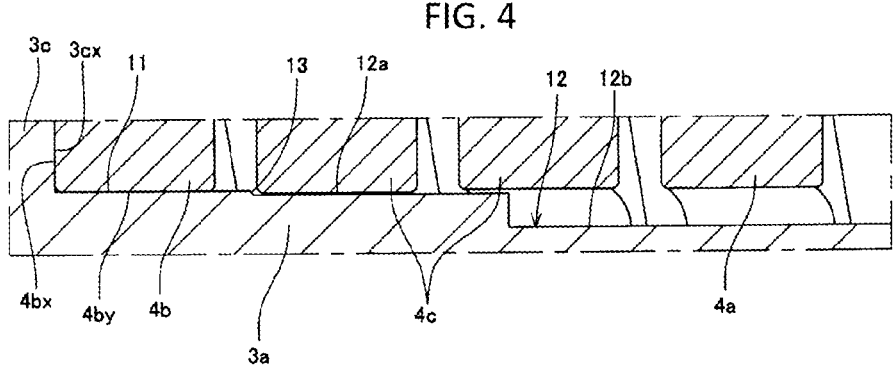
FIG. 4 is an enlarged view of a portion IV in FIG. 1.

As shown in FIG. 1 to FIG. 3, the pulley structure 1 includes an outer rotation body 2 (one rotation body), an inner rotation body 3 (the other rotation body), a torsion coil spring 4 (hereinafter, simply referred to as "spring 4"), an end cap 5, and a pair of bearings 6 and 7 including a sliding bearing 6 and a rolling bearing 7.

The outer rotation body 2 and the inner rotation body 3 are both substantially cylindrical and made of a metal (for example, carbon steel material such as S45C), and have the same rotation axis A (the rotation axis of the pulley structure 1, hereinafter simply referred to as "rotation axis A"). The rotation axis A extends along a left-right direction (axial direction) in FIG. 1. The right side of FIG. 1 is one end side and the left side of FIG. 1 is the other end side. The belt B is wound around an outer circumferential surface of the outer rotation body 2.

The inner rotation body 3 is provided inward of the outer rotation body 2 and is rotatable with respect to the outer rotation body 2. The inner rotation body 3 includes a cylinder body 3a into which the drive shaft S of the alternator is fitted, an outer cylinder portion 3b disposed outside the cylinder body 3a on the other end, and an annular plate portion 3c connecting the other end of the cylinder body 3a and the other end of the outer cylinder portion 3b. The drive shaft S is screwed into a thread groove in an inner circumferential surface of the cylinder body 3a.

The spring 4 is accommodated between the outer rotation body 2 and the inner rotation body 3. More specifically, the spring 4 is accommodated in a space R on the other end side with respect to the rolling bearing 7, which is defined by an inner circumferential surface of the outer rotation body 2 and an inner circumferential surface 3bx of the outer cylinder portion 3b of the inner rotation body 3, an outer circumferential surface of the cylinder body 3a of the inner rotation body 3 (a first contact surface 11, a facing surface 12, an inclined surface 13 or the like to be described later), the annular plate portion 3c of the inner rotation body 3, and an annular plate portion 2c of the outer rotation body 2. The spring 4 is formed of a wire material having a square cross section (for example, an oil tempered wire for springs (in accordance with JIS G3560:1994)), and is left-handed (counterclockwise from a tip end 4bz in a circumferential direction of the other end region 4b to be described later).

The end cap 5 is disposed at the other end of the outer rotation body 2 and the inner rotation body 3.

The pair of bearings 6 and 7 are interposed between the outer rotation body 2 and the inner rotation body 3 on the other end side and the one end side, respectively. Specifically, the sliding bearing 6 is interposed between the inner circumferential surface of the outer rotation body 2 on the other end and an outer circumferential surface of the outer cylinder portion 3b of the inner rotation body 3. The rolling bearing 7 is interposed between the inner circumferential surface of the outer rotation body 2 on one end and the outer circumferential surface of the cylinder body 3a of the inner rotation body 3 on one end portion. The outer rotation body 2 and the inner rotation body 3 are connected via the pair of bearings 6 and 7 so as to be relatively rotatable about the rotation axis A. The outer rotation body 2 and the inner rotation body 3 rotate clockwise when viewed from a direction from the other end to the one end (indicated by bold arrows in FIG. 2 and FIG. 3, and hereinafter, referred to as "forward direction").

An inner diameter of the outer rotation body 2 is gradually reduced from the other end to the one end. The inner circumferential surface of the outer rotation body 2 in the smallest inner diameter portion is a pressure contact surface 2a. The inner circumferential surface of the outer rotation body 2 in the second smallest inner diameter portion is an annular surface 2b. The inner diameter of the outer rotation body 2 at the pressure contact surface 2a is smaller than an inner diameter of the outer cylinder portion 3b of the inner rotation body 3. The inner diameter of the outer rotation body 2 at the annular surface 2b is equal to or larger than the inner diameter of the outer cylinder portion 3b of the inner rotation body 3.

The outer circumferential surface of the cylinder body 3a of the inner rotation body 3 has the first contact surface 11, the facing surface 12, and the inclined surface 13. The first contact surface 11 is located at the other end portion of the cylinder body 3a. The first contact surface 11 is in contact with an inner circumferential surface 4by of the other end region 4b of the spring 4, as to be described later.

The facing surface 12 is located closer to the one end side than the first contact surface 11. The facing surface 12 faces and is spaced apart from the inner circumferential surface of the spring 4, as to be described later. The other end portion of the facing surface 12 in the axial direction serves as a constraining surface 12a. A diameter D2 of the constraining surface 12a is larger than a diameter D3 of the other portion 12b of the facing surface 12 and is slightly smaller than a diameter D1 of the first contact surface 11.

For example, a length obtained by lengthening the diameter D2 of the constraining surface 12a by about 1% is the diameter D1 of the first contact surface 11. For another example, a length obtained by lengthening the diameter D3 of the portion 12b of the facing surface 12 by about 2% to 25% is the diameter D1 of the first contact surface 11. For example, when a length obtained by lengthening the diameter D3 of the portion 12b of the facing surface 12 by 12% is the diameter D1 of the first contact surface 11, the diameter D1 of the first contact surface 11 is about 31.4 mm, the diameter D2 of the constraining surface 12a is about 31.0 mm, and the diameter D3 of the portion 12b is about 28.0 mm.

The inclined surface 13 is located between the first contact surface 11 and the constraining surface 12a in the axial direction. The inclined surface 13 is inclined with respect to the axial direction such that the diameter increases from the one end side to the other end side in the axial direction, and connects the first contact surface 11 and the constraining surface 12a. An inclination angle of the inclined surface 13 with respect to the axial direction is, for example, about 60°.

The overall diameter of the cylinder body 3a gradually decreases from the other end side to the one end side in the axial direction. Accordingly, as to be described later, when setting the spring 4 on the cylinder body 3a from the one side in the axial direction to insert the cylinder body 3a into the spring 4, the spring 4 can be set smoothly.

The spring 4 has one end region 4a in contact with the pressure contact surface 2a of the outer rotation body 2 at the one end side, the other end region 4b in contact with the first contact surface 11 of the inner rotation body 3 at the other end side, and a middle region 4c between the one end region 4a and the other end region 4b and not in contact with the outer rotation body 2 nor the inner rotation body 3 in a state where no external force is applied to the pulley structure 1. The one end region 4a and the other end region 4b are regions extending from the one end and the other end of the spring 4 over a half circumference or more (180 degrees or more around the rotation axis), respectively. For example, when the number of turns of the spring 4 is four, each of the one end region 4a and the other end region 4b is a region extending from the other end of the spring 4 to a half circumference or more and having an upper limit of about one circumference from the other end of the spring 4. Here, an axial length of the constraining surface 12a is equal to or longer than an axial length of the other end region 4b in a state before the press fitting. As shown in FIG. 2, of the other end region 4b, the vicinity of a position away from the tip end 4bz in the circumferential direction of the spring 4 by 90° around the rotation axis is a second region 4b2, a portion on the other end side with respect to the second region 4b2 is a first region 4b1, and the remaining portion is a third region 4b3.

In the pulley structure 1, as to be described later, when the spring 4 is press-fitted into the cylinder body 3a of the inner rotation body 3, the inner circumferential surface 4by of the other end region 4b comes into contact with the first contact surface 11 of the inner rotation body 3, and the other end surface 4bx, which is an end surface of the other end region 4b in the axial direction, comes into contact with a second contact surface 3cx, which is an end surface of the annular plate portion 3c on the one end side. The second contact surface 3cx is formed in a spiral shape, and substantially the entire region in the circumferential direction of an axial end surface of the other end surface 4bx comes into contact with the second contact surface 3cx. The spring 4 has a constant diameter over the entire length before the press fitting. An outer diameter of the spring 4 at this time is smaller than the inner diameter of the outer rotation body 2 on the annular surface 2b and larger than the inner diameter of the outer rotation body 2 on the pressure contact surface 2a. The spring 4 is accommodated in the space R in a state where the diameter of the one end region 4a is decreased.

An inner diameter D4 of the spring 4 before the press fitting is smaller than the diameter D1 of the first contact surface 11 and is substantially the same as the diameter D2 of the constraining surface 12a. More specifically, for example, the diameter D2 of the constraining surface 12a is equal to or smaller than an upper limit value that is 0.15 mm smaller than a reference dimension of the inner diameter D4 of the spring 4 before the press fitting, and is equal to or larger than an lower limit value that is 0.05 mm smaller than the upper limit value. That is, the diameter D2 of the constraining surface 12a and the inner diameter D4 of the spring 4 (the other end region 4b) before the press fitting are made substantially the same so that the diameter D2 of the constraining surface 12a is within a range in which the allowable minimum value (a dimension 0.15 mm smaller than the reference dimension) of the inner diameter D4 of the spring 4 (the other end region 4b) before the press fitting is the upper limit value and a dimension 0.05 mm smaller than the upper limit value is the lower limit value.

The outer circumferential surface of the one end region 4a of the spring 4 is pressed against the pressure contact surface 2a of the outer rotation body 2 by a self-elastic restoring force of the spring 4 in a diameter increasing direction, and the inner circumferential surface 4by of the other end region 4b of the spring 4 is in contact with the first contact surface 11 in a state where the diameter thereof is slightly increased. That is, the inner circumferential surface 4by of the other end region 4b of the spring 4 is pressed against the first contact surface 11 by the self-elastic restoring force of the spring 4 in a diameter decreasing direction. In a state where the inner circumferential surface 4by of the other end region 4b of the spring 4 is in contact with the first contact surface 11, a gap is formed between the inner circumferential surface 3bx of the outer cylinder portion 3b and the outer circumferential surface of the other end region 4b of the spring 4. A gap is formed between the annular surface 2b of the outer rotation body 2 and the outer circumferential surface of the spring 4.

The first contact surface 11 is a surface extending continuously over the entire circumference of the cylinder body 3a in the circumferential direction of the inner rotation body 3, and parallel to the axial direction. In the state where no external force is applied to the pulley structure 1, the inner circumferential surface 4by of the other end region 4b of the spring 4 is substantially parallel to the axial direction. An axial length of the first contact surface 11 is longer than the axial length of the other end region 4b. Therefore, in the where no external force is applied to the pulley structure 1, the inner circumferential surface 4by of the other end region 4b of the spring 4 comes into contact with the first contact surface 11 over the entire axial length.

As shown in FIG. 2, an arc-shaped abutment surface 3dx, which faces the tip end 4bz of the other end region 4b in the circumferential direction of the spring 4, is formed in the inner circumferential surface 3bx of the outer cylinder portion 3b of the inner rotation body 3. As shown in FIG. 2, a protrusion 3e, which protrudes radially inward and faces the outer circumferential surface of the other end region 4b of the spring 4, is provided in the inner circumferential surface 3bx of the outer cylinder portion 3b. The protrusion 3e faces the second region 4b2 of the spring 4. In the present embodiment, in the state where no external force is applied to the pulley structure 1, the outer circumferential surface of the spring 4 and the protrusion 3e are separated from each other and a gap is formed therebetween, as shown in FIG. 2. However, the outer circumferential surface of the spring 4 and the protrusion 3e may be in contact with each other.

The spring 4 is compressed in the axial direction in the state where no external force is applied to the pulley structure 1 (that is, when the pulley structure 1 is in a stop state). In this state, a compression rate of the spring 4 in the axial direction is about 20%. The compression rate of the spring 4 in the axial direction is calculated by $100 \times (L0-L1)/L0(\%)$, where L1 is the axial length of the spring 4 in the state where no external force is applied to the pulley structure 1 and L0 is the natural length of the spring 4.

Next, an operation of the pulley structure 1 is described.

First, a case where the rotation speed of the outer rotation body 2 is higher than the rotation speed of the inner rotation body 3 (i.e., a case where the outer rotation body 2 accelerates) is described.

In this case, the outer rotation body 2 rotates with respect to the inner rotation body 3 in the forward direction (a direction of a thick arrow in FIG. 2 and FIG. 3). With the relative rotation of the outer rotation body 2, the one end region 4a of the spring 4 moves together with the pressure contact surface 2a and rotates with respect to the inner rotation body 3. Accordingly, the spring 4 is twisted in the diameter increasing direction. A pressure contact force of the one end region 4a of the spring 4 against the pressure contact surface 2a increases as a torsion angle of the spring 4 in the diameter increasing direction increases. The second region 4b2 is most likely to be subjected to torsion stress, and is separated from the first contact surface 11 when the torsion angle of the spring 4 in the diameter increasing direction increases. The outer circumferential surface of the second region 4b2 abuts against the protrusion 3e at substantially the same time when the second region 4b2 is separated from the first contact surface 11, or when the torsion angle of the spring 4 in the diameter increasing direction is further increased. When the outer circumferential surface of the second region 4b2 abuts against the protrusion 3e, the deformation of the other end region 4b in the diameter increasing direction is limited, the torsion stress is dispersed in the portion of the spring 4 other than the other end region 4b, and particularly the torsion stress acting on the one end region 4a of the spring 4 increases. Accordingly, a difference in torsion stress acting on respective portions of the spring 4 is reduced, and strain energy can be absorbed by the entire spring 4. Thus, local fatigue failure of the spring 4 can be prevented.

The pressure contact force of the third region 4b3 against the first contact surface 11 decreases as the torsion angle of the spring 4 in the diameter increasing direction increases. The pressure contact force of the third region 4b3 against the first contact surface 11 is substantially zero at the same time when the second region 4b2 abuts against the protrusion 3e, or when the torsion angle of the spring 4 in the diameter increasing direction is further increased. The torsion angle of the spring 4 in the diameter increasing direction at this time is $\theta 1$ (for example, $\theta 1=3°$). When the torsion angle of the spring 4 in the diameter increasing direction is larger than $\theta 1$, the third region 4b3 is deformed in the diameter increasing direction to move away from the first contact surface 11. However, the spring 4 does not bend near a boundary between the third region 4b3 and the second region 4b2, and the other end region 4b is maintained in an arc shape. That is, the other end region 4b of the spring 4 is maintained in a shape that allows the protrusion 3e to easily slide. Therefore, when the torsion angle increases and the torsion stress applied to the other end region 4b increases, the other end region 4b moves in the circumferential direction against the pressure contact force of the second region 4b2 against the protrusion 3e and the pressure contact force of the first region 4b1 against the first contact surface 11, and the tip end 4bz of the other end region 4b presses the abutment surface 3dx. When the tip end 4bz of the other end region 4b presses the abutment surface 3dx in the circumferential direction, a torque can be reliably transmitted between the outer rotation body 2 and the inner rotation body 3.

When the torsion angle of the spring 4 in the diameter increasing direction is $\theta 1$ or more and less than $\theta 2$ (for example, $\theta 2=45°$), the third region 4b3 is separated from the first contact surface 11 and is not in contact with the inner circumferential surface 3bx of the outer cylinder portion 3b, and the second region 4b2 is in pressure contact with the protrusion 3e. Therefore, in this case, the effective number of turns of the spring 4 is larger and a spring constant is smaller as compared with a case where the torsion angle of the spring 4 in the diameter increasing direction is less than $\theta 1$. When the torsion angle of the spring 4 in the diameter increasing direction reaches $\theta 2$, the outer circumferential surface of the middle region 4c of the spring 4 abuts against the annular surface 2b, or the torsion angle of the spring 4 in the diameter increasing direction reaches a limit. Thereby, further deformation of the spring 4 in the diameter increasing direction is limited, and the outer rotation body 2 and the inner rotation body 3 rotate integrally. Accordingly, damage due to the deformation of the spring in the diameter increasing direction can be prevented.

Next, a case where the rotation speed of the outer rotation body 2 is lower than the rotation speed of the inner rotation body 3 (i.e., a case where the outer rotation body 2 decelerates) is described.

In this case, the outer rotation body 2 rotates with respect to the inner rotation body 3 in a reverse direction (a direction opposite to the direction of the thick arrow in FIG. 2 and FIG. 3). With the relative rotation of the outer rotation body 2, the one end region 4a of the spring 4 moves together with the pressure contact surface 2a and rotates with respect to the inner rotation body 3. Accordingly, the spring 4 is twisted in the diameter decreasing direction. When the torsion angle of the spring 4 in the diameter decreasing direction is less than $\theta 3$ (for example, $\theta 3=10°$), the pressure contact force of the one end region 4a against the pressure contact surface 2a slightly decreases as compared with the case where the torsion angle is zero, but the one end region 4a is in pressure contact with the pressure contact surface 2a. Further, the pressure contact force of the other end region 4b against the first contact surface 11 slightly increases as compared with the case where the torsion angle is zero. When the torsion angle of the spring 4 in the diameter decreasing direction is $\theta 3$ or more, the pressure contact force of the one end region 4a against the pressure contact surface 2a is substantially zero, and the one end region 4a slides in the circumferential direction with respect to the pressure contact surface 2a. Therefore, no torque is transmitted between the outer rotation body 2 and the inner rotation body 3.

<Press Fitting of Spring into Inner Rotation Body>

Figure 5A:
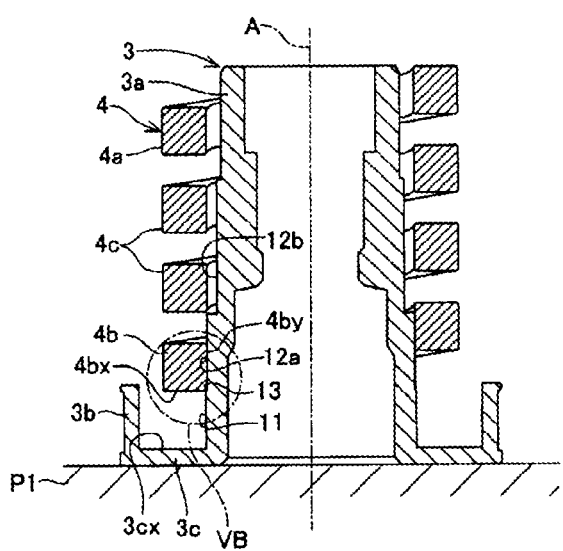
FIG. 5A is a diagram showing a state where an inner rotation body is placed on a lower plate of a press machine and a spring is set on the inner rotation body.
Figure 5B:
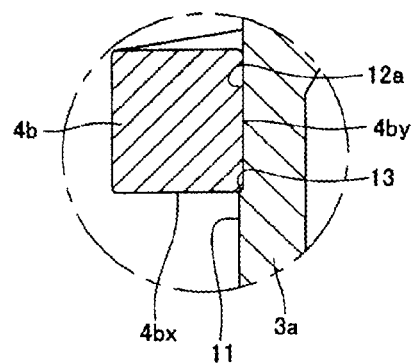
FIG. 5B is an enlarged view of a VB portion in FIG. 5A.
Figure 6A:
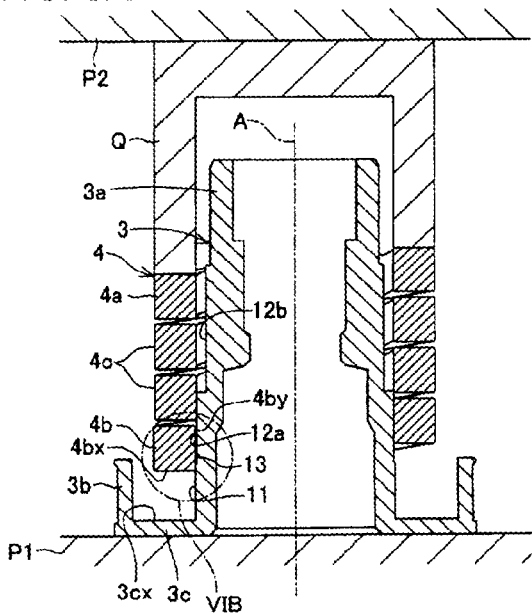
FIG. 6A is a diagram showing a state immediately after press fitting of the spring into the inner rotation body is started.
Figure 6B:
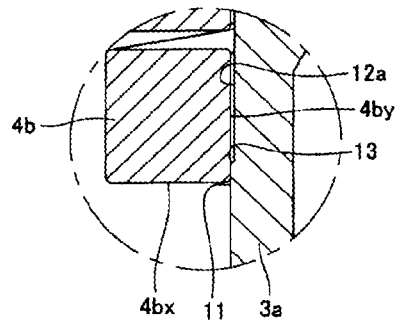
FIG. 6B is an enlarged view of a VIB portion in FIG. 6A.
Figure 7A:
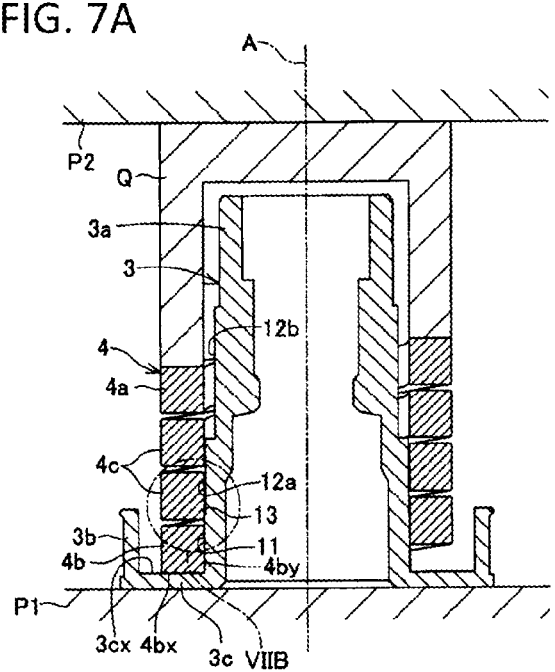
FIG. 7A is a diagram showing a state where pressing of the spring by the press machine is completed.
Figure 7B:
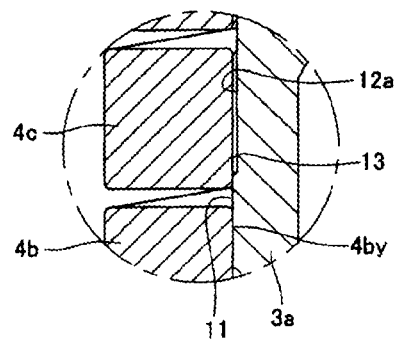
FIG. 7B is an enlarged view of a VIIB portion in FIG. 7A.

Next, a procedure for press-fitting the spring 4 into the cylinder body 3a of the inner rotation body 3 when producing the pulley structure 1 is described. When press-fitting the spring 4 into the cylinder body 3a, first, as shown in FIG. 5A and FIG. 5B, the inner rotation body 3 is placed on a lower plate P1 of a press machine so that one end side thereof in the axial direction is the upper side. Then the spring 4 is set on the inner rotation body 3 to insert the cylinder body 3a into the spring 4. The spring 4 is set by, for example, a robot arm. At this time, the other end region 4b in a spiral shape and the spiral second contact surface 3cx of the annular plate portion 3c are aligned in the circumferential direction, so as to set the spring 4 in the cylinder body 3a.

As described above, since the inner diameter D4 of the spring 4 before the press fitting is substantially the same as the diameter D2 of the constraining surface 12a, when setting the spring 4 on the cylinder body 3a, a portion of the cylinder body 3a forming the constraining surface 12a is inserted into the other end region 4b of the spring 4, and the other end region 4b is in a state of being constrained by the constraining surface 12a. Accordingly, the axis of the set spring 4 is not displaced (eccentric, inclined) from the rotation axis A of the inner rotation body 3 and substantially coincides with the rotation axis of the rotation bodies 2 and 3 (hereinafter, described as "the posture of the spring 4 is stabilized"). Since the axial length of the constraining surface 12a is longer than the axial length of the other end region 4b at this time, the other end region 4b is constrained by the constraining surface 12a over the entire axial length thereof. Accordingly, the posture of the spring 4 is more reliably stabilized.

Next, as shown in FIG. 6A and FIG. 6B and FIG. 7A and FIG. 7B, the spring 4 is pressed downward by an upper plate P2 of a press machine to which a pressing tool Q for pressing the spring 4 is attached, and the other end region 4b of the spring 4 is press-fitted into a portion of the cylinder body 3a forming the first contact surface 11. Then, after press-fitting the spring 4, as shown in FIG. 8A and FIG. 8B, the pressing of the press machine against the spring 4 released, and a spring press-fitted body 50 formed by press-fitting the spring 4 into the inner rotation body 3 is removed from the lower plate P1 of the press machine.

During the press fitting, the other end region 4b of the spring 4 gets over the inclined surface 13 and moves to a position where the inner circumferential surface 4by faces the first contact surface 11 while increasing the diameter thereof. Since the spring 4 is in a spiral shape, when the spring 4 getting over the inclined surface 13, only a part of the other end region 4b in the circumferential direction comes into contact with the inclined surface 13, and other parts thereof are not in contact with the inclined surface 13. During the press fitting, the pressing load is concentrated on a portion where the other end region 4b is in contact with the inclined surface 13. However, in the present embodiment, as described above, when the spring 4 is constrained by the constraining surface 12a, a pressing load is applied in a state where the posture of the spring 4 is stabilized. Thus, the spring 4 receives a pressing load in a state where the axis of the spring 4 substantially coincides with the rotation axis A of the inner rotation body, and moves without being distorted or inclined.

Figure 8A:
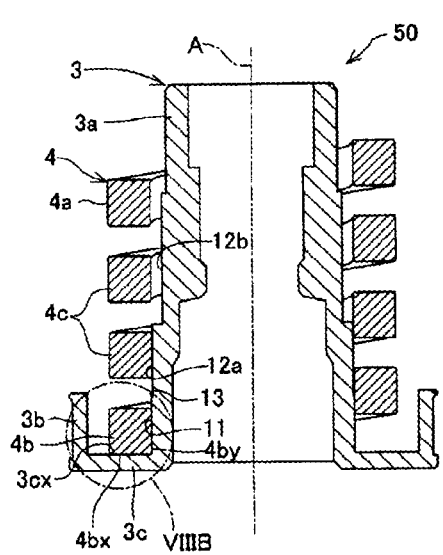
FIG. 8A is a diagram showing a completed spring press-fitted body.
Figure 8B:
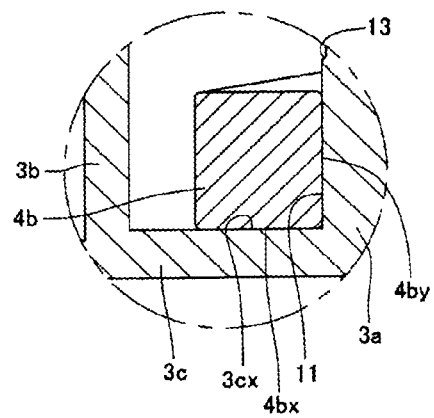
FIG. 8B is an enlarged view of a VIIIB portion in FIG. 8A.

As a result, as shown in FIG. 8A and FIG. 8B, in the spring press-fitted body 50, the adhesion between the other end surface 4bx of the spring 4 and the second contact surface 3cx is high.

Further, in this case, the pressing load applied to the spring 4 during the press fitting can be minimized Therefore, it is less likely to occur that the inclined surface 13 is linearly scraped to generate metal powders due to the sliding between the other end portion of the spring 4 in the axial direction and the inclined surface 13 when the other end region 4b of the spring 4 moves and gets over the inclined surface 13.

In the present embodiment, as described above, when the spring 4 is simply set on the inner rotation body 3 to insert the cylinder body 3a of the inner rotation body 3 into the spring 4, the other end region 4b of the spring 4 is constrained by the constraining surface 12a. Thus, the posture of the spring 4 is stabilized. Therefore, when setting the spring 4 on the inner rotation body 3, there is no need for the operator to perform a correction operation described later or to constrain the spring 4 with respect to an external constraining unit (for example, the pressing tool Q or the upper plate P2) such that the axis of the spring 4 is not displaced (eccentric, inclined) from the axis of the inner rotation body 3. Therefore, as described above, the spring 4 can be set on the inner rotation body 3 by the robot arm, and the labor can be reduced in the step of press-fitting the spring 4 into the inner rotation body 3.

The adhesion between the other end surface 4bx of the spring 4 and the second contact surface 3cx is high in the spring press-fitted body 50. Thus, in the pulley structure 1 configured by using the spring press-fitted body 50, the axis of the spring 4 is less likely to be displaced (eccentric, inclined) from the rotation axis A of the rotation bodies 2 and 3 due to external factors such as vibration. Accordingly, the above problems that spring 4 cannot be stably twisted and deformed due to the unstable posture of the spring 4 can be prevented.

As described above, metal powders are less likely to be generated when press-fitting the spring 4 into the inner rotation body 3. Therefore, when the pulley structure 1 is configured by using the spring press-fitted body 50 or when the pulley structure 1 is used thereafter, it is less likely that the released metal powders adhere to the sliding bearing 6 or portions of the rotation bodies that are frequently in contact with the torsion coil spring (for example, the first contact surface 11, the pressure contact surface 2a, and the annular surface 2b). As a result, these portions are less likely to be worn and the life of the pulley structure 1 can be extended.

<Conventional Pulley Structure without Constraining Surface>

Figure 9:
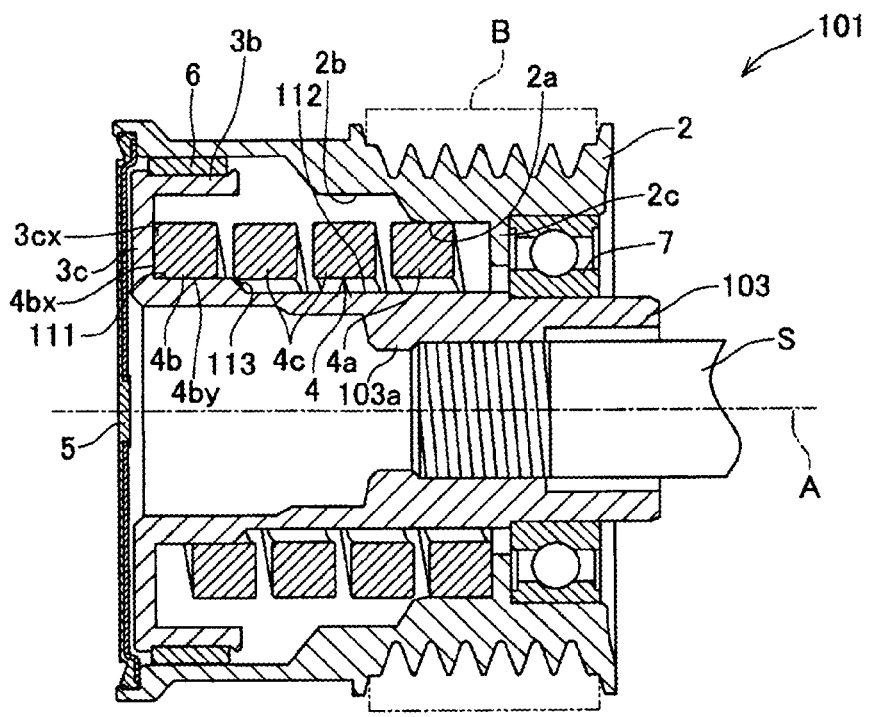
FIG. 9 is a diagram showing an example of a pulley structure in which a facing surface of the inner rotation body does not have a constraining surface, which corresponds to FIG. 1.

A conventional pulley structure 101 as shown in FIG. 9, which is different from the pulley structure 1 of the present embodiment, is described. The pulley structure 101 is obtained by replacing the inner rotation body 3 in the pulley structure 1 with an inner rotation body 103.

An outer circumferential surface of the cylinder body 103a of the inner rotation body 103 has a first contact surface 111, a facing surface 112, and an inclined surface 113. The first contact surface 111 is the same as the first contact surface 11 of the pulley structure 1. The facing surface 112 is located on one side of the first contact surface 111 in the axial direction. Unlike the facing surface 12 of the pulley structure 1, the facing surface 112 has a constant diameter over the entire axial length. The diameter of the facing surface 112 is substantially the same as the diameter D3 of the portion 12b of the facing surface 12. The inclined surface 113 is located between the first contact surface 111 and the facing surface 112 in the axial direction. The inclined surface 113 is inclined with respect to the axial direction such that the diameter increases from the one end side to the other end side in the axial direction, and connects the first contact surface 111 and the facing surface 112. The inclination angle of the inclined surface 113 with respect to the axial direction is, for example, about 60°. The configuration of the inner rotation body 103 other than the above is the same as that of the inner rotation body 3 of the pulley structure 1.

Figure 10A:
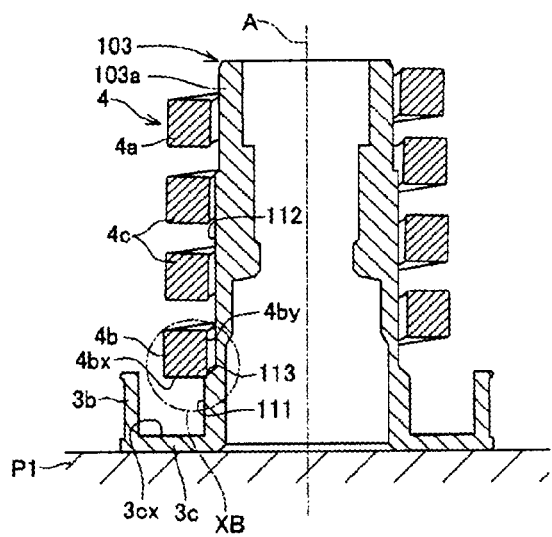
FIG. 10A is a diagram corresponding to FIG. 5A for the pulley structure of FIG. 9.
Figure 10B:
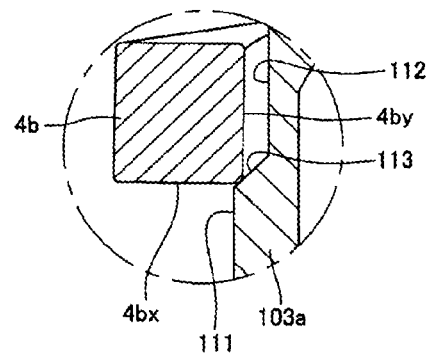
FIG. 10B is an enlarged view of a XB portion in FIG. 10A.
Figure 11A:
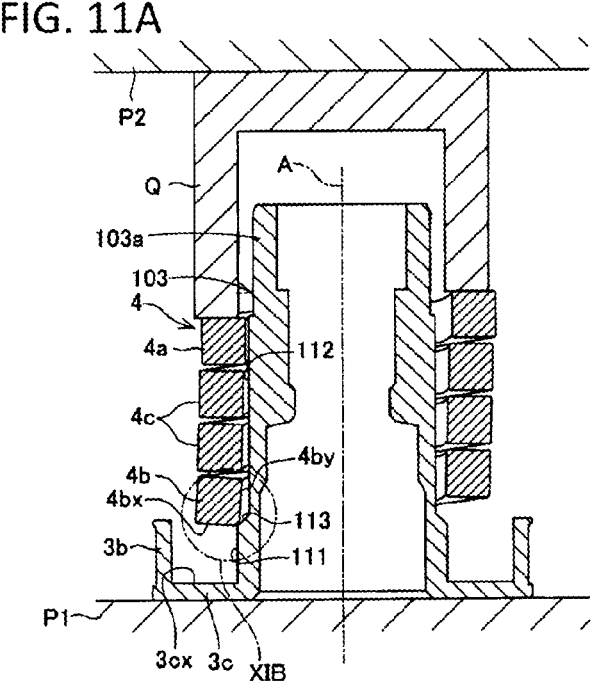
FIG. 11A is a diagram corresponding to FIG. 6A for the pulley structure of FIG. 9.
Figure 11B:
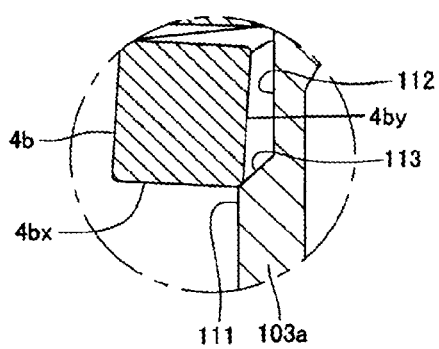
FIG. 11B is an enlarged view of a XIB portion in FIG. 11A.
Figure 12A:
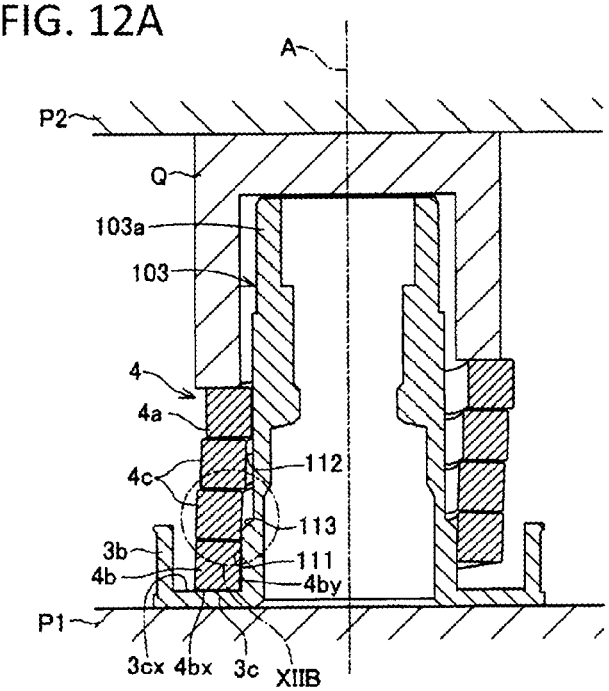
FIG. 12A is a diagram corresponding to FIG. 7A for the pulley structure of FIG. 9.
Figure 12B:
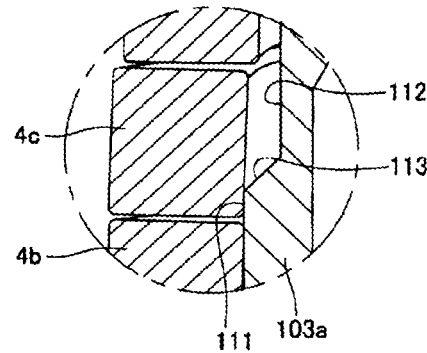
FIG. 12B is an enlarged view of a XIIB portion in FIG. 12A.

Next, a case of press-fitting the spring 4 into the inner rotation body 103 in the same procedure as the case of press-fitting the spring 4 into the inner rotation body 3 in the present embodiment is described. In this case, first, as shown in FIG. 10A and FIG. 10B, the inner rotation body 103 is placed on the lower plate P1 of the press machine so that one end side thereof in the axial direction is the upper side. Then the spring 4 is set on the inner rotation body 103 to insert a cylinder body 103a into the spring 4. At this time, since the inner diameter D4 of the spring 4 is smaller than the diameter D1 of the first contact surface 111 and larger than the diameter D3 of the facing surface 112, a part of the other end region 4b in the circumferential direction comes into contact with the inclined surface 113, and other parts of the other end region 4b are separated from the inclined surface 113. Further, the facing surface 112 of the inner rotation body 103 has no constraining surface. Therefore, the other end region 4b is not sufficiently constrained by the inner rotation body 103, and the posture of the spring 4 is unstable. That is, the axis of the spring 4 may be displaced (eccentric, inclined) with respect to the rotation axis A of the inner rotation body 103.

Next, as shown in FIG. 11A, FIG. 11B, FIG. 12A, and FIG. 12B, when the spring 4 is pressed downward through the pressing tool Q by the upper plate P2 of the press machine to which the pressing tool Q is attached, the other end region 4b of the spring 4 is press-fitted into a portion of the cylinder body 103a forming the first contact surface 111. Then, after press-fitting the spring 4, as shown in FIG. 13A and FIG. 13B, the pressing of the press machine against the spring 104 released, and a spring press-fitted body 150 formed by press-fitting the spring 4 into the inner rotation body 103 is removed from the lower plate P1 of the press machine.

During the press fitting, the other end region 4b gets over the inclined surface 113 and moves to a position facing the first contact surface 111 while increasing the diameter thereof. When getting over the inclined surface 113, the pressing load is concentrated on a portion (a portion in the circumferential direction) of the other end region 4b which is in contact with the inclined surface 113. At this time, when the axis of the spring 4 is displaced from the rotation axis A of the inner rotation body 103, the portion where the other end region 4b is in contact with the inclined surface 113 is stuck on the inclined surface 113, and the other end region 4b of the spring 4 may be distorted by the pressing load of the press machine.

Figure 13A:
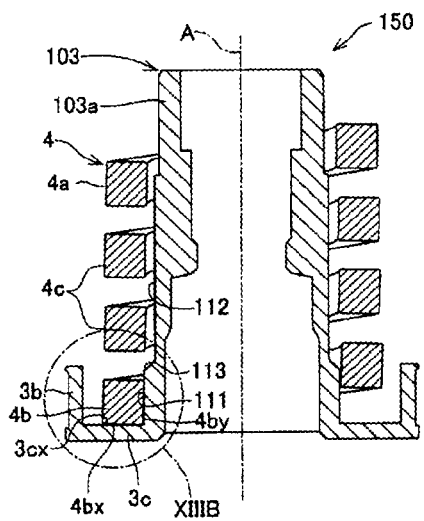
FIG. 13A is a diagram corresponding to FIG. 8A for the pulley structure of FIG. 9.
Figure 13B:
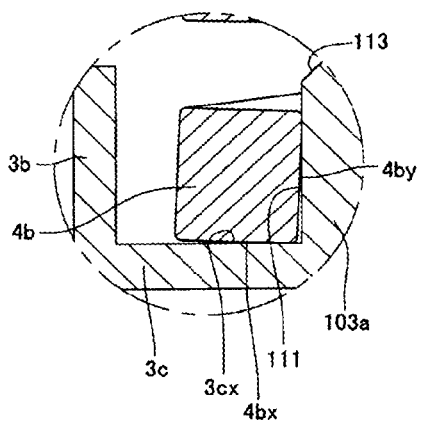
FIG. 13B is an enlarged view of a XIIIB portion in FIG. 13A.

When the pressing load of the press machine is further increased and the other end region 4b of the spring 4 is press-fitted to a position facing the first contact surface 111 in this state, as shown in FIG. 13A and FIG. 13B, the adhesion between the other end surface 4bx of the spring 4 and the second contact surface 3cx is poor in the spring press-fitted body 150.

In this case, the pressing load applied to the spring 4 during the press fitting increases. Thus, when the other end region 4b of the spring 4 moves and gets over the inclined surface 113, it is likely to occur that the inclined surface 113 is linearly scraped to generate metal powders due to the sliding between the other end region 4b and the inclined surface 113.

The adhesion between the other end surface 4bx of the spring 4 and the second contact surface 3cx is poor in the spring press-fitted body 150. Thus, in the pulley structure 101 configured by using the spring press-fitted body 150, the axis of the spring 4 is likely to be displaced from the rotation axis A of the rotation bodies 2 and 103 due to external factors such as vibration. Therefore, the above problems that spring 4 cannot be stably twisted and deformed due to the unstable posture of the spring 4 are likely to occur.

As described above, metal powders are likely to be generated when press-fitting the spring 4 into the inner rotation body 103. Therefore, when the pulley structure 101 is configured by using the spring press-fitted body 150 or when the pulley structure 101 is used thereafter, the released metal powders are likely to adhere to the sliding bearing 6 or portions of the rotation bodies 2 and 103 that are frequently in contact with the spring 4 (for example, the first contact surface 111, the pressure contact surface 2a, and the annular surface 2b). As a result, these portions are likely to be worn and the life of the pulley structure 101 may be shortened.

EXAMPLES

Next, Examples of the present invention is described.

Example

In Example, a spring was press-fitted into the inner rotation body by the same procedure as shown in FIG. 5A to FIG. 8B to prepare a spring press-fitted body similar to the spring press-fitted body 50 of the above embodiment. In Example, the spring was set on the inner rotation body by the robot arm (automatic insertion). It took about 5 seconds to set the spring on the inner rotation body. In Example, a press-fitting time of the press machine was set to 15 seconds. Here, the press-fitting time is the time from the start of the pressing of the press machine against the spring to the complete release of the pressing of the press machine.

Comparative Examples 1 to 3

In Comparative Examples 1 to 3, each spring was press-fitted into the inner rotation body by the same procedure as shown in FIG. 10A to FIG. 13B to prepare a spring press-fitted body similar to the above spring press-fitted body 150. In Comparative Examples 1 to 3, the operator manually set the spring on the inner rotation body. More specifically, in Comparative Example 1, when setting the spring on the inner rotation body, the operator performed a correction operation to correct the posture so as not to displace the axis of the spring from the axis of the inner rotation body until the start of the pressing of the press machine (manual insertion+correction operation). Therefore, in Comparative Example 1, it took about 10 seconds, longer than that in Example, to set the spring on the inner rotation body. In Comparative Example 1, in order to reliably and safely perform the above correction operation, the press-fitting time of the press machine was set to about 20 seconds, longer than that in Example.

On the other hand, in Comparative Examples 2 and 3, each spring was set on the inner rotation body without performing the correction operation as in Comparative Example 1 (manual insertion). In Comparative Examples 2 and 3, it took about 5 seconds (same as that in Example) to set the spring on the inner rotation body. However, in Comparative Examples 2 and 3, each spring was set on the inner rotation body by setting using a dedicated jig (not shown) such that the axis of the spring did not incline more than 1° with respect to the rotation axis of the inner rotation body. The reason for doing so is to clarify a fact that the above problems occur even when the inclination of the axis of the spring with respect to the rotation axis of the inner rotation body is slight (1° or less).

In Comparative Example 2, the press-fitting time of the press machine was set to 15 seconds, the same as that in Example. On the other hand, in Comparative Example 3, the press-fitting time of the press machine was set to 30 seconds, sufficiently longer than that in Example, in order to determine whether the above correction operation was unnecessary if the press-fitting time of the press machine was extended.

<Evaluation on Production Quality>

Table 1 shows evaluation results of the production quality of the spring press-fitted bodies in Example and Comparative Examples 1 to 3.

TABLE 1

| | | Example | Comparative Example 1 | Comparative Example 2 | Comparative Example 3 |
|---|---|---|---|---|---|
| Method of setting spring | | Automatic insertion | Manual insertion and correction operation | Manual insertion | Manual insertion |
| Posture of spring in insertion state of spring | | A | C (B after correction operation) | C | C |
| Movement of the other end of spring in initial press-fitting state | | A | C | C | C |
| Spring press-fitted body | Posture of spring | A | A | C (inclined) | C (inclined) |
| | Damage to inner rotation body | A | B | C | C |

Table 1 shows the evaluation results of the posture of the spring in a state where the spring is set on the inner rotation body (spring-inserted state). Specifically, when the axis of the spring was eccentric and inclined with respect to the rotation axis of the inner rotation body, the posture of the spring was determined to be unstable, and the evaluation was rated as C. When the axis of the spring was eccentric but was not inclined with respect to the rotation axis of the inner rotation body, the posture of the spring was determined to be substantially stable, and the evaluation was rated as B. When the axis of the spring was not eccentric and inclined with respect to the rotation axis of the inner rotation body, the posture of the spring was determined to be stable, and the evaluation was rated as A.

The reason why the case where the axis of the spring is eccentric but is not inclined with respect to the rotation axis of the inner rotation body is evaluated as B not C is that in this case, in an initial press-fitting state (the state corresponding to FIG. 6A, FIG. 6B, FIG. 11A, and FIG. 11B thereafter, the portion where the other end region is in contact with the inclined surface moves along the inclined surface to a position where the axis of the spring substantially coincides with and the rotation axis of the inner rotation body, and thus there is a high possibility that the posture of the spring is stabilized. The evaluation results of Comparative Example 1 in Table 1 show that the evaluation before the correction operation is C, and the evaluation after the correction operation is B.

Further, Table 1 shows an evaluation result of whether the other end region has gotten over the inclined surface and has begun to come into contact with the first contact surface in the initial press-fitting state (state corresponding to FIG. 6A, FIG. 6B, FIG. 11A, and FIG. 11B). Specifically, when the other end region was stuck on the inclined surface and was in contact with the inclined surface, the evaluation was rated as C. When the other end region got over the inclined surface and started to be in contact with the first contact surface, the evaluation was rated as A.

Here, during the actual press-fitting of the spring, the upper plate P2 automatically moves from the start of the press-fitting of the spring to the completion thereof. However, for the above evaluation, the movement of the upper board P2 is temporarily stopped in the initial press-fitting state, and after the evaluation, the movement of the upper plate P2 is manually restarted. The above press-fitting time does not include the time when the press machine is temporarily stopped.

Table 1 shows evaluation of the posture of the spring in the completed spring press-fitted body. More specifically, when the axis of the spring in the press-fitted body was in a state of being distorted, such as eccentric or inclined, with respect to the rotation axis of the inner rotation body, the posture of the spring was determined to be unstable, and the evaluation was rated as C. Specifically, when there is a noticeable displacement in the circumferential direction regarding a radial length of the gap between the inner circumferential surface of the one end region of the spring and the facing surface of the inner rotation body, the evaluation was rated as C. When the axis of the spring in the spring press-fitted body was not in a state of being distorted, such as eccentric or inclined, with respect to the rotation axis of the inner rotation body, the posture of the spring was determined to be stable, and the evaluation was rated as A. Specifically, when there is no displacement in the circumferential direction regarding the radial length of the gap between the inner circumferential surface of the one end region of the spring and the facing surface of the inner rotation body, the evaluation was rated as A. The parenthesized "inclined" in the evaluation results of Comparative Examples 2 and 3 means that there is no eccentricity described above, but there is the inclination described above.

Table 1 shows evaluation of the damage to the inner rotation body (scratch on the boundary portion between the inclined surface and the first contact surface) due to the sliding between the spring and the inner rotation body during the press fitting in the completed spring press-fitted body. Specifically, when scratches in the axial direction were clearly confirmed visually at the boundary portion between the inclined surface and the first contact surface on the inner rotation body, and the metal powders released by scraping the boundary portion were visually detected, the evaluation was rated as C. When the above scratches were visually confirmed, but the degree of damage was very slight, and the above metal powders were not visually detected at all, the evaluation was rated as B. When none of the above scratches was visually confirmed, the evaluation was rated as A. This evaluation was performed by disassembling the completed spring press-fitted body.

The reason why the production quality is not evaluated until the other end portion of the spring comes into contact with the end surface of the annular plate portion in the state where the spring is pressed in by the press machine (the state shown in FIG. 7A, FIG. 7B, FIG. 12A, and FIG. 12B) is that the spring is in a state of being strongly compressed, making it difficult to accurately evaluate the posture.

<Evaluation on Productivity>

Table 2 shows evaluation results of evaluating the productivity of Example and Comparative Examples 1 to 3, based on a total time including an insertion time required to set the spring on the inner rotation body and the press-fitting time required to press-fit the spring by the press machine. Specifically, in Example and Comparative Examples 1 to 3, Comparative Example 3 having the longest total time was evaluated as C, Example and Comparative Example 2 having the shortest total time were evaluated as A, and Comparative Example 1 having a total time between the above two total times was evaluated as B. The parenthesized items in Table 2 show the detail of the insertion time and the press-fitting time included in the total time. For example, (5+15) in Example 1 indicates that, in the total time of 20 seconds, the insertion time is 5 seconds and the press-fitting time is 15 seconds.

TABLE 2

|  | Example | Comparative Example 1 | Comparative Example 2 | Comparative Example 3 |
| --- | --- | --- | --- | --- |
| Total time (insertion time + press-fitting time) (s) | 20 (5 + 15) | 30 (10 + 20) | 20 (5 + 15) | 35 (5 + 30) |
| Evaluation result | A | B | A | C |

<Evaluation on Possibility of Labor Saving>

Table 3 shows evaluation results of the possibility of labor saving of Example and Comparative Examples 1 to 3 based on the evaluation results of Table 1. Specifically, when the evaluations in the insertion state and the initial press-fitting state of the spring in Table 1 were both C, it was determined that labor saving in a press-fitting step of the spring was difficult, and the evaluation was rated C. When the evaluation result in Table 1 was A or B, and even only one evaluation B was included, it was determined that labor saving was possible in the press-fitting step of the spring, but in order to further improve the production quality, it was determined that operating conditions (such as a pressing speed) were need to be adjusted, and the evaluation was rated as B. When all of the evaluation results in Table 1 were A, it was determined that labor saving was sufficiently possible in the press-fitting step of the spring, and the evaluation was rated as A. However, as shown in Table 3, the evaluation was A in Example, and all the evaluations were C in Comparative Examples 1 to 3, which were not an example in which the evaluation was rated as B.

TABLE 3

| | Example | Comparative Example 1 | Comparative Example 2 | Comparative Example 3 |
|---|---|---|---|---|
| Evaluation result of possibility of labor saving | A | C | C | C |

<Comprehensive Evaluation>

Table 4 shows the comprehensive evaluation of Example and Comparative Examples 1 to 3 based on the evaluation results of Table 1 to Table 3. Specifically, even when only one evaluation C was included in the two evaluation results (the posture of the spring and the damage to the inner rotation body) for the spring press-fitted body in Table 1, the comprehensive evaluation was rated as C. When the two evaluation results for the spring press-fitted body in Table 1 were either B or A and even only one evaluation B was included, the comprehensive evaluation was rated as B. When all the evaluation results shown in Table 1 to Table 3 were A, the comprehensive evaluation was rated as A.

TABLE 4

| | Example | Comparative Example 1 | Comparative Example 2 | Comparative Example 3 |
|---|---|---|---|---|
| Comprehensive evaluation | A | B | C | C |

It is seen from the above results that the pulley structure (Example) according to the present invention, which has a constraining surface capable of constraining the other end region of the spring before the spring is press-fitted into the first contact surface, is superior to the conventional pulley structures (Comparative Examples 1 to 3), in which the pulley structure does not have the constraining surface on the other end side of the facing surface in the axial direction, in production quality and productivity. It is also seen that in the conventional pulley structure having no constraining surface, the production quality is not improved even when the press-fitting time of the spring is extremely delayed (Comparative Example 3) unless the above posture correction is performed.

It is also seen that in the pulley structure according to the present invention having the constraining surface, it is not necessary to correct the posture when setting the spring on the inner rotation body before press-fitting the spring, and the spring can be set on the inner rotation body by the robot arm, so that labor saving of the press-fitting step of the spring can be achieved.

<Pressing Load During Press Fitting>

Table 5 shows compression rates of the springs in the initial press-fitting state (the state corresponding to FIG. 6A, FIG. 6B, FIG. 11A, and FIG. 11B) and the press-fitting completion state (the state corresponding to FIG. 7A, FIG. 7B, FIG. 12A, and FIG. 12B) in Example and Comparative Examples 1 to 3. When the spring is compressed until the gap between spring wires is eliminated, the compression rate of the spring is about 33%.

TABLE 5

| | Example | Comparative Example 1 | Comparative Example 2 | Comparative Example 3 |
|---|---|---|---|---|
| Compression rate (%) of spring in initial press-fitting state | About 27 | About 27 | About 27 | About 27 |
| Compression rate (%) of spring in press-fitting completion state | About 27 | About 29 | About 31 | About 31 |

As seen from Table 5, in the initial press-fitting state, the compression rates of the springs in Example and Comparative Examples 1 to 3 are almost the same, whereas in the press-fitting completion state, the compression rate of the spring in Example is smaller than those of Comparative Examples 1 to 3. Therefore, it can be seen that, in the Example, the pressing load when the other end region of the spring gets over the inclined surface and is press-fitted to the position in contact with the first contact surface is smaller than those in Comparative Examples 1 to 3.

Although a preferred embodiment of the present invention has been described above, the present invention is not limited to the embodiment described above, and various modifications can be made without departing from the scope of the claims.

For example, the axial length of the constraining surface may be substantially the same as the axial length of the other end region 4b. Alternatively, the axial length of the constraining surface may be slightly shorter than the axial length of the other end region 4b.

For example, a plurality of convex portions arranged at intervals in the circumferential direction may be provided at the other end portion in the axial direction of the portion of the cylinder body 3a forming the facing surface, and a radial surface of each convex portion may serve as a constraining surface.

If the portion of the cylinder body 3a forming the constraining surface 12a is inserted into the spring 4 when the spring 4 is set on the inner rotation body 3, the diameter D2 of the constraining surface 12a may be larger than the above upper limit value and smaller than the inner diameter D4 of the other end region 4b of the spring 4 before the press fitting. If the other end region 4b can be sufficiently constrained and the posture of the spring 4 can be stabilized when the spring 4 is set on the inner rotation body 3, the diameter D2 of the constraining surface 12a may be smaller than the above lower limit value.

The cross section of the wire material of the torsion coil spring is not limited to a square shape, and may be a rectangular shape or a circular shape. The diameter of the spring 4 in a state of not receiving an external force may not be constant over the entire length.

The protrusion 3e may extend to the abutment surface 3dx along the circumferential direction. The protrusion 3e may not be provided.

A contact range between the pressure contact surface 2a and the first contact surface 11 at one end and the other end of the spring 4 in a state where no external force is applied to the pulley structure is not limited to a range extending from the one end and the other end to a half circumference or more, and may be longer or shorter than this.

The abutment surface $3dx$ is not limited to an arc shape when viewed in the axial direction, and may be in a linear shape along the radial direction. An inner circumferential portion thereof may be in a linear shape or an arc shape inclined with respect to the radial direction, and an outer circumferential portion thereof may be in a linear shape along the radial direction.

The one end region of the torsion coil spring may come into contact with the inner rotation body, and the other end region of the torsion coil spring may come into contact with the outer rotation body. In this case, the inner rotation body corresponds to the one rotation body of the present invention, and the outer rotation body corresponds to the other rotation body of the present invention.

The pulley structure is not limited to being installed to the shaft of the alternator. The pulley structure may be installed to the shaft of an auxiliary unit other than the alternator, for example.

Although the present invention has been described in detail with reference to a specific embodiment, it is obvious to those skilled in the art that various changes and modifications may be made without departing from the gist and the scope of the invention.

This application is based on Japanese Patent Application 2018-099470 filed on May 24, 2018, and Japanese Patent Application 2019-088735 filed on May 9, 2019, contents of which are incorporated by reference herein.

REFERENCE SIGNS LIST

1 Pulley structure
2 Outer rotation body
3 Inner rotation body
$3cx$ Second contact surface
4 Spring (torsion coil spring)
$4a$ One end region
$4b$ The other end region
$4c$ Middle region
11 First contact surface
12 Facing surface
$12a$ Constraining surface
13 Inclined surface

The invention claimed is:

1. A pulley structure comprising:
a cylindrical outer rotation body around which a belt is to be wound;
an inner rotation body which is provided inward of the outer rotation body and relatively rotatable with respect to the outer rotation body about a same rotation axis as the outer rotation body; and
a torsion coil spring which is provided between the outer rotation body and the inner rotation body,
wherein the torsion coil spring comprises:
one end region which is on one end side in an axial direction along the rotation axis and in contact with one rotation body of the outer rotation body and the inner rotation body;
the other end region which is on the other end side in the axial direction and in contact with the other rotation body of the outer rotation body and the inner rotation body; and
a middle region which is between the one end region and the other end region and not in contact with the outer rotation body nor the inner rotation body in a state where no external force is applied to the pulley structure,
wherein the other rotation body comprises:
a first contact surface which is in contact with an inner circumferential surface of the other end region of the torsion coil spring in the state where no external force is applied to the pulley structure;
a facing surface which is located closer to the one end side in the axial direction than the first contact surface, and is spaced apart from and facing an inner circumferential surface of the torsion coil spring;
an inclined surface which is located between the first contact surface and the facing surface in the axial direction, connects the first contact surface and the facing surface, and is inclined with respect to the axial direction; and
a second contact surface which is in contact with an end surface on the other end side of the torsion coil spring in the axial direction,
wherein in a case where the torsion coil spring is twisted in a diameter increasing direction due to a relative rotation between the outer rotation body and the inner rotation body, at least a part of the other end region of the torsion coil spring is configured to be separated from the first contact surface,
wherein when the torsion coil spring is press-fitted into the other rotation body, the inner circumferential surface of the other end region is brought into contact with the first contact surface and the end surface on the other end side in the axial direction is brought into contact with the second contact surface,
wherein the facing surface comprises a constraining surface connected to the inclined surface, and
wherein the constraining surface is configured to be capable of constraining the other end region of the torsion coil spring before press fitting so as to prevent a displacement of an axis of the torsion coil spring before the press fitting with respect to an axis of the other rotation body.

2. The pulley structure according to claim 1, wherein the constraining surface extends continuously over an entire circumference of the other rotation body in a circumferential direction.

3. The pulley structure according to claim 2, wherein a diameter of the constraining surface is substantially equal to an inner diameter of the other end region of the torsion coil spring before the press fitting.

4. The pulley structure according to claim 3, wherein the diameter of the constraining surface is equal to or smaller than an upper limit value that is 0.15 mm smaller than a reference dimension of the inner diameter of the other end region of the torsion coil spring before the press fitting, and is equal to or larger than a lower limit value that is 0.05 mm smaller than the upper limit value.

5. The pulley structure according to claim 1, wherein a length of the constraining surface in the axial direction is equal to or longer than a length of the other end region of the torsion coil spring in the axial direction before the press fitting.

* * * * *